US011267463B2

(12) United States Patent
Kawasaki et al.

(10) Patent No.: US 11,267,463 B2
(45) Date of Patent: Mar. 8, 2022

(54) INFORMATION PROCESSING DEVICE, INFORMATION PROCESSING METHOD, AND COMPUTER PROGRAM PRODUCT

(71) Applicant: Kabushiki Kaisha Toshiba, Tokyo (JP)

(72) Inventors: Atsushi Kawasaki, Yokohama Kanagawa (JP); Tsuyoshi Tasaki, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/911,198

(22) Filed: Mar. 5, 2018

(65) Prior Publication Data

US 2019/0118808 A1 Apr. 25, 2019

(30) Foreign Application Priority Data

Oct. 19, 2017 (JP) .............................. JP2017-202802

(51) Int. Cl.
*B60W 30/095* (2012.01)

(52) U.S. Cl.
CPC ..... *B60W 30/0956* (2013.01); *B60W 2552/30* (2020.02); *B60W 2554/00* (2020.02); *B60W 2554/80* (2020.02)

(58) Field of Classification Search
CPC ......... B60W 30/0956; B60W 2550/10; B60W 2550/30
See application file for complete search history.

(56) References Cited

U.S. PATENT DOCUMENTS

| 8,676,487 | B2 | 3/2014 | Sakai et al. | |
| 2011/0313664 | A1* | 12/2011 | Sakai | B60W 30/08 701/301 |
| 2013/0131925 | A1* | 5/2013 | Isaji | B62D 6/00 701/41 |
| 2014/0142780 | A1* | 5/2014 | Chen | B60W 40/072 701/1 |
| 2014/0297170 | A1 | 10/2014 | Sakima et al. | |
| 2014/0330479 | A1* | 11/2014 | Dolgov | B60W 30/16 701/28 |
| 2015/0151725 | A1* | 6/2015 | Clarke | B60W 30/00 701/28 |

(Continued)

FOREIGN PATENT DOCUMENTS

| JP | 2002068404 A | * | 3/2002 |
| JP | 2007066047 A | * | 3/2007 |

(Continued)

OTHER PUBLICATIONS

English Translation JP2007066047A.*

(Continued)

*Primary Examiner* — Rami Khatib
(74) *Attorney, Agent, or Firm* — Finnegan, Henderson, Farabow, Garrett & Dunner L.L.P.

(57) ABSTRACT

According to an embodiment, an information processing device includes one or more processors. The one or more processors are configured to obtain moving object information related to a moving object; obtain road information; and calculate a predicted movement range of the moving object based on the moving object information and the road information.

10 Claims, 8 Drawing Sheets

(56) References Cited

U.S. PATENT DOCUMENTS

| | | |
|---|---|---|
| 2015/0336587 A1 | 11/2015 | Inoue et al. |
| 2017/0102707 A1* | 4/2017 | Reichel ............... B60W 30/095 |
| 2017/0129434 A1* | 5/2017 | Sun ..................... B60R 21/013 |
| 2017/0240186 A1* | 8/2017 | Hatano ................ B60W 10/04 |
| 2017/0270373 A1* | 9/2017 | Kawasaki .......... G06K 9/00798 |
| 2018/0345957 A1* | 12/2018 | Ohmura ............... B60W 30/09 |
| 2019/0001973 A1* | 1/2019 | Matsunaga .............. B60T 7/12 |

FOREIGN PATENT DOCUMENTS

| | | |
|---|---|---|
| JP | 2008-14819 A | 1/2008 |
| JP | 4853525 | 11/2011 |
| JP | 2012-164159 A | 8/2012 |
| JP | 2014-191597 A | 10/2014 |
| JP | 2015-219830 A | 12/2015 |

OTHER PUBLICATIONS

Kim et al., "Probabilistic and Holistic Prediction of Vehicle States Using Sensor Fusion for Application to Integrated Vehicle Safety Systems," IEEE Transactions on Intelligent Transportation Systems (Oct. 2014), 15:2178-90.

\* cited by examiner

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-202802, filed on Oct. 19, 2017; the entire contents of which are incorporated herein by reference.

FIELD

An embodiment described herein relates generally to an information processing device, an information processing method, and a computer program product.

BACKGROUND

A technology is known that predicts the range of movement of other moving objects present around the vehicle. For example, a technology has been disclosed that calculates the degree of normalcy of the movement status of a moving object according to the position and the velocity of that moving object; and, higher the degree of normalcy, narrower is the range in which the movement area is predicted. Moreover, for example, a technology has been disclosed in which, greater the difference between a moving object and the center line of a road, the wider is the predicted range of movement that is calculated.

Meanwhile, at a traffic intersection, or at a right-hand turn or a left-hand turn, or at a sharp curve; there are times when a moving object deviates from the recommended path while running on the road. However, whether or not a moving object will run in such fashion is difficult to estimate from the position and the velocity of that moving object. For that reason, conventionally, it is difficult to accurately calculate the predicted range of movement.

DETAILED DESCRIPTION

In general, according to an embodiment, an information processing device includes one or more processors. The one or more processors are configured to obtain moving object information related to a moving object; obtain road information; and calculate a predicted movement range of the moving object based on the moving object information and the road information.

An embodiment will be described below in detail with reference to the accompanying drawings.

Figure 1:
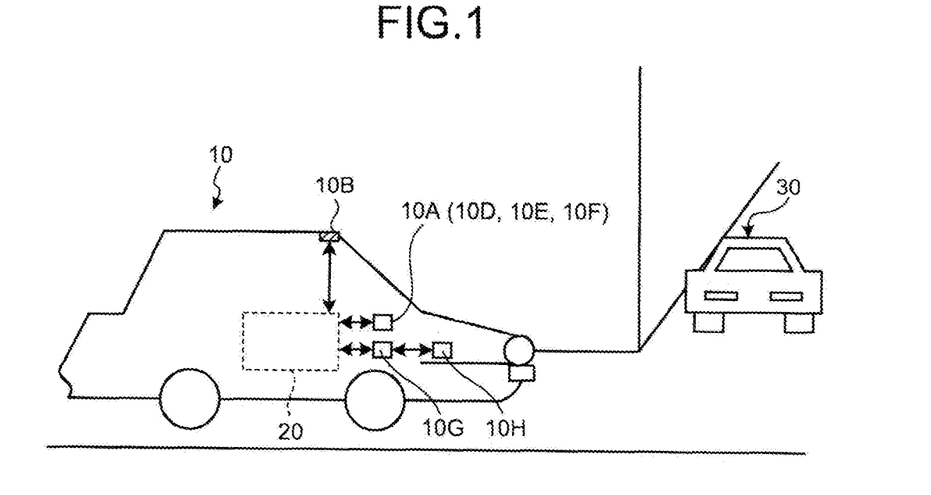
FIG. 1 is a diagram illustrating an example of a moving object.

FIG. 1 is a diagram illustrating an example of a moving object 10 according to the embodiment.

The moving object 10 includes an information processing device 20, an output unit 10A, a sensor 10B, a driving control unit 10G, and a driving unit 10H.

The information processing device 20 calculates the predicted range of movement of the target moving object. Herein, the predicted range of movement indicates the range of movement that is predicted for the target moving object. Moreover, the target moving object implies the moving object for which the predicted range of movement is to be calculated.

The moving object is a mobile object. Examples of the moving object include a vehicle (a motorcycle, an automobile, or a bicycle), a wagon, a robot, a marine vessel, a flying object (an airplane, an unmanned aerial vehicle (UAV), or a drone), a person, and an animal. More particularly, a moving object either implies a moving object that runs when driven by a person, or implies a moving object that automatically runs (performs autonomous running) without involving the driving by a person. Examples of an automatically-drivable moving object includes a self-driving vehicle. In the embodiment, the explanation is given with reference to an example in which the moving object is an autonomously-drivable vehicle.

Moreover, in the embodiment, the explanation is given with reference to an example in which the information processing device 20 is installed in the moving object 10. Furthermore, in the embodiment, the information processing device 20 calculates the predicted range of movement of other moving objects other than the moving object 10 in which the information processing device 20 is installed. In the following explanation, each such another vehicle for which the predicted range of movement is to be calculated is referred to as another vehicle 30. That is, in the embodiment, a configuration is explained in which the information processing device 20 installed in the moving object 10 calculates the predicted range of movement of the other vehicle 30.

Figure 2:
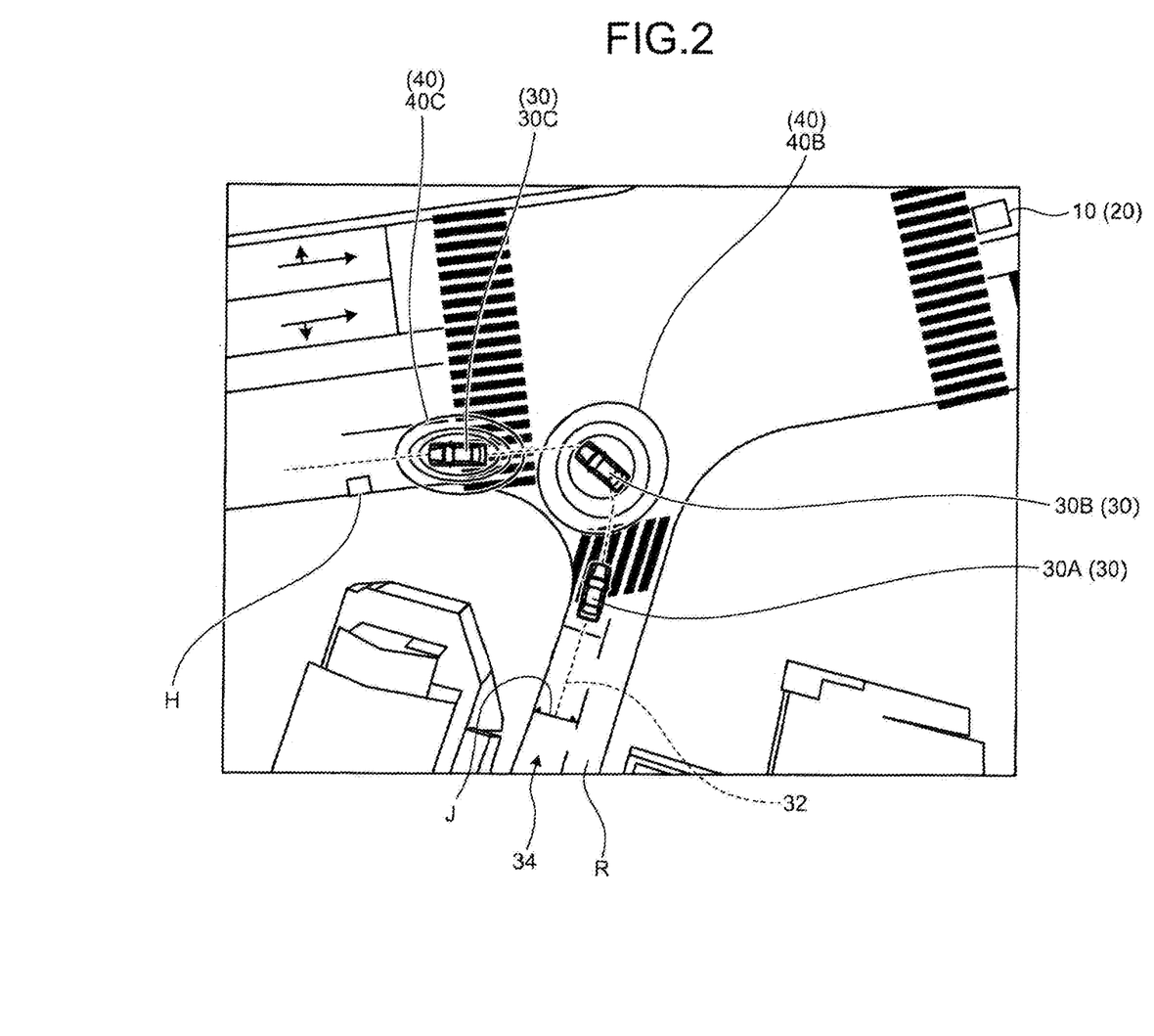
FIG. 2 is an explanatory diagram of a predicted movement range.

FIG. 2 is an explanatory diagram of an example of a predicted movement range 40. As illustrated in FIG. 2, in the embodiment, the information processing device 20 installed in the moving object 10 calculates the predicted movement range 40 of the other vehicle 30 (details given later).

Meanwhile, the information processing device 20 is not limited to be installed in the moving object. Alternatively, the information processing device 20 can be installed in a stationary object, which is an immovable object or which is stationary with respect to the ground surface. Examples of the stationary object include a guardrail, a pole, a building, a road, a sidewalk, an obstacle, a solid body, a parked vehicle, or a road sign. Still alternatively, the information processing device 20 can be installed in a cloud server that performs operations in the cloud.

Returning to the explanation with reference to FIG. 1, a sensor 10B is an external sensor for the outside world and obtains detection information. In the embodiment, the sensor 10B is meant for detecting the other vehicle 30.

The sensor 10B is, for example, a photographing device or a distance sensor (a millimeter-wave radar or a laser sensor). The photographing device takes photographs and obtains photographic image data (hereinafter, may be called photographic images). The photographic image data can be digital image data in which a pixel value is defined for each pixel or can be a depth map in which the distance from the sensor 10B is defined for each pixel. The laser sensor can be a two-dimensional LIDAR sensor or a three-dimensional LIDAR sensor (LIDAR stands for Laser Imaging Detection and Ranging).

The output unit 10A outputs a variety of output information. For example, the output unit 10A has a communication function for sending the output information, a display function for displaying the output information, and a sound output function for outputting a sound indicating the output information. For example, the output unit 10A includes a communicating unit 10D, a display 10E, and a speaker 10F.

The communicating unit 10D communicates a variety of data with other devices. For example, the communicating unit 10D sends the output information via a known communication line. Moreover, for example, the communicating unit 10D receives a variety of information from external devices via a known communication line.

The display 10E displays the output information. Examples of the display 10E include a known liquid crystal display (LCD), or a projector, or a light. The speaker 10F outputs a sound indicating the output information.

The driving unit 10H is a device for driving the moving object 10. Examples of the driving unit 10H include an engine, a motor, and wheels.

The driving control unit 10G controls the driving unit 10H. Thus, the driving unit 10H gets driven under the control of the driving control unit 10G. For example, based on the output information output from the information processing device 20 and based on the information obtained from the sensor 10B, the driving control unit 10G determines the surrounding situation and controls the amount of acceleration, the amount of braking, and the steering angle. For example, the driving control unit 10G controls the vehicle so as to avoid obstacles and keep the vehicle on the currently-followed traffic lane, as well as to maintain the inter-vehicular distance to the vehicle in front at a predetermined distance or more.

Figure 3:
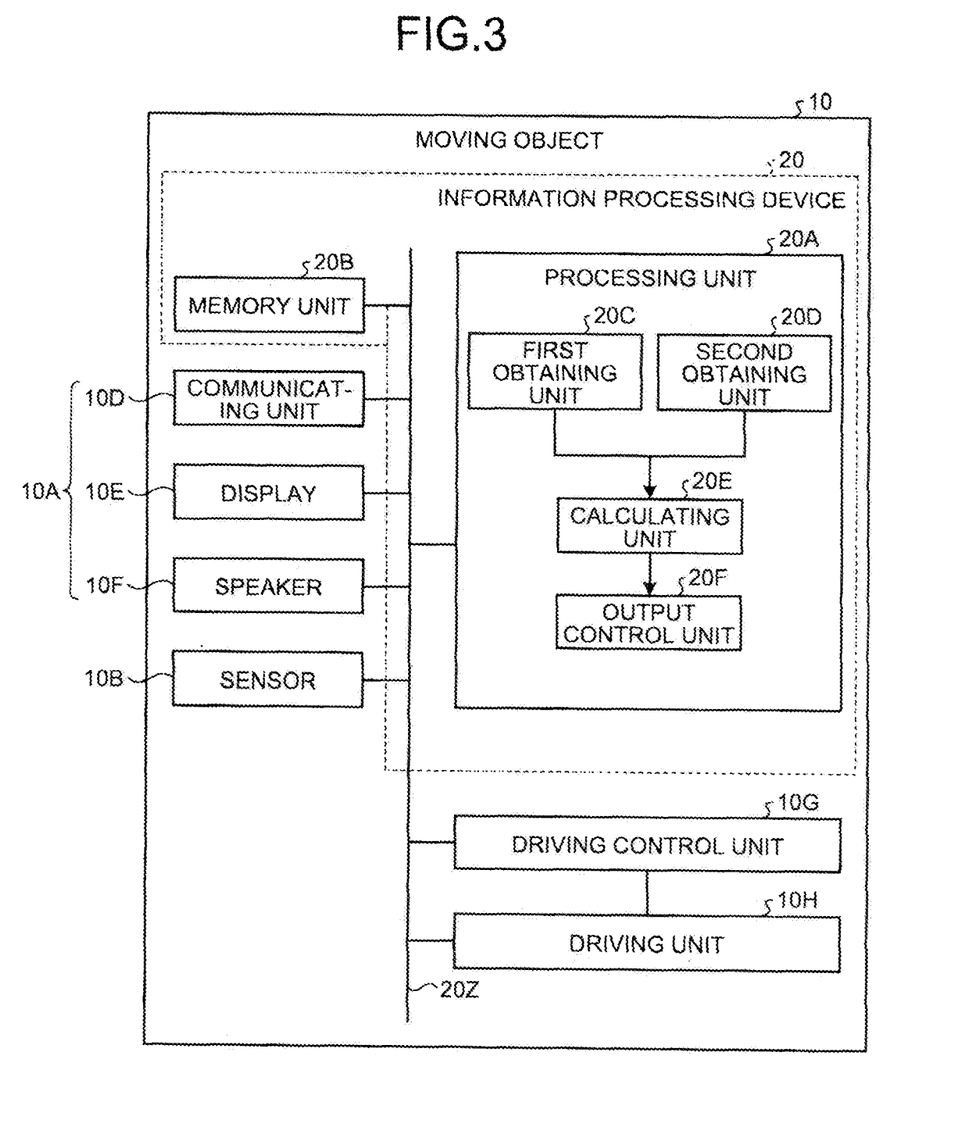
FIG. 3 is a block diagram illustrating a configuration of an information processing device.

Given below is the detailed description of a configuration of the information processing device 20. FIG. 3 is a block diagram illustrating an exemplary configuration of the information processing device 20.

For example, the information processing device 20 is a dedicated computer or a general-purpose computer. The information processing device 20 includes a processing unit 20A and a memory unit 20B.

The processing unit 20A, the memory unit 20B, the output unit 10A, the sensor 10B, the driving control unit 10G, and the driving unit 10H are connected to each other via a bus 20Z. Meanwhile, the memory unit 20B, the output unit 10A (the communicating unit 10D, the display 10E, and the speaker 10F), and the sensor 10B can be connected to the processing unit 20A either in a wireless manner or in a wired manner. Alternatively, the sensor 10B and at least one of the memory unit 20B, the output unit 10A (the communicating unit 10D, the display 10E, and the speaker 10F) can be connected to the processing unit 20A via a network.

The memory unit 20B is used to store a variety of data. Examples of the memory unit 20B include a random access memory (RAM), a semiconductor memory device such as a flash memory, a hard disk, or an optical disc. Meanwhile, the memory unit 20B can be an external memory device of the information processing device 20. Alternatively, the memory unit 20B can be a memory medium. More particularly, the memory medium can be used to store or temporarily store computer programs and a variety of information that is downloaded via a local area network (LAN) or the Internet. Still alternatively, the memory unit 20B can be configured using a plurality of memory mediums. Still alternatively, the memory unit 20B can be installed in a cloud server that is connected to the information processing device 20 via a network.

The processing unit 20A includes a first obtaining unit 20C, a second obtaining unit 20D, a calculating unit 20E, an output control unit 20F.

The abovementioned constituent elements (the first obtaining unit 20C, the second obtaining unit 20D, the calculating unit 20E, and the output control unit 20F) are implemented using, for example, one or more processors. For example, the abovementioned constituent elements can be implementing by making a processor such as a central processing unit (CPU) execute computer programs, that is, can be implemented using software. Alternatively, the abovementioned constituent elements can be implemented using a processor such as a dedicated integrated circuit (IC), that is, can be implemented using hardware. Still alternatively, the abovementioned constituent elements can be implemented using a combination of software and hardware. In the case of using a plurality of processors, each processor hither can implement one of the constituent elements or can implement two or more constituent elements.

The first obtaining unit 20C obtains moving object information, which represents the information of the other vehicle 30 that is the target moving vehicle for calculating the predicted movement range 40.

More particularly, the moving object information indicates the running condition of the other vehicle 30. More specifically, the moving object information indicates at least one of the position, the angle, the velocity, the acceleration, the angular velocity, and the angular acceleration of the other vehicle 30.

For example, the first obtaining unit 20C calculates the moving object information of the other vehicle 30 using the detection information of the sensor 10B and according to a known method, and thus obtains the moving object information.

Alternatively, the first obtaining unit 20C can receive the moving object information of the other vehicle 30 from an external device or from the other vehicle 30 via the communicating unit 10D.

The second obtaining unit 20D obtains road information, which indicates the running environment of the other vehicle 30. That is, the road information indicates the road on which the other vehicle 30 is currently running and indicates the roads in the vicinity of the road.

The road information more specifically indicates at least one of a reference path, the traffic lane width, the curvature of the reference path, the position of an obstacle, and the size of obstacle.

The following explanation is given with reference to FIG. 2. A reference path 32 indicates the recommended line for running on a road R on which the other vehicle 30 is either currently running or intends to run. The reference path 32 is set in advance for each traffic lane 34. The traffic lane 34 indicates a strip-shaped area provided for the passage of vehicles in a single line. For example, the reference path 32 is provided to pass through the center in the width direction of the traffic lane 34.

The reference path 32 is expressed using, for example, a group of a plurality of points (see FIG. 2). Alternatively, the reference path 32 can be expressed as a straight line, a spline curve, or a clothoid curve.

A traffic lane width J represents the width of the traffic lane 34. More particularly, the traffic lane width indicates the length in the direction that is orthogonal to the direction of travel of the vehicles. The curvature of the reference path 32 indicates the curvature of one or more curved areas in the reference path 32. The position and the size of an obstacle H either can be an absolute position and an absolute size or can be a relative position and a relative size.

The second obtaining unit 20D obtains, for example, map data from an external device via the communicating unit 10D, and thus obtains the road information of the other vehicle 30. In this case, the map data is assumed to contain road information about the road R on which the other vehicle 30 is currently running and about the roads R around the road R. Meanwhile, the second obtaining unit 20D can obtain the road information of the other vehicle 30 according to some other method. For example, the second obtaining unit 20D can obtain the road information from the detection information of the sensor 10B. Alternatively, the second obtaining unit 20D can obtain the road information from the map data obtained from an external device and the detection information obtained from the sensor 10B. Still alternatively, the second obtaining unit 20D can obtain the road information from the map data stored in the memory unit 20B.

Given below is the explanation about the calculating unit 20E.

The calculating unit 20E calculates the predicted movement range 40 of the other vehicle 30 based on the moving object information and the road information.

The predicted movement range 40 indicates the predicted range of movement of the other vehicle 30 at each prediction timing. Herein, a prediction timing indicates a timing after the current timing (that is, the present and the future).

The shape of the predicted movement range 40 is not particularly limited. For example, the predicted movement range 40 can have an elliptical shape as illustrated in FIG. 2; or can have a rectangular shape, or a polygonal shape, or a circular shape.

In the embodiment, the calculating unit 20E calculates the predicted movement range 40 of the other vehicle 30 using the curvature of the reference path 32, the drivable range, and the angular velocity corresponding to the curvature of the reference path 32 as indicated in the moving object information and the road information.

Meanwhile, there are times when at least one of the curvature of the reference path 32, the drivable range, and the angular velocity corresponding to the curvature of the reference path 32 is not included in the moving object information obtained by the first obtaining unit 20C and the road information obtained by the second obtaining unit 20D.

In this case, the calculating unit 20E calculates the predicted movement range 40 according to the moving object information obtained by the first obtaining unit 20C, the road information obtained by the second obtaining unit 20D, and the calculation result of calculating at least one of the curvature of the reference path 32, the drivable range, and the angular velocity corresponding to the curvature of the reference path 32.

Figure 4:
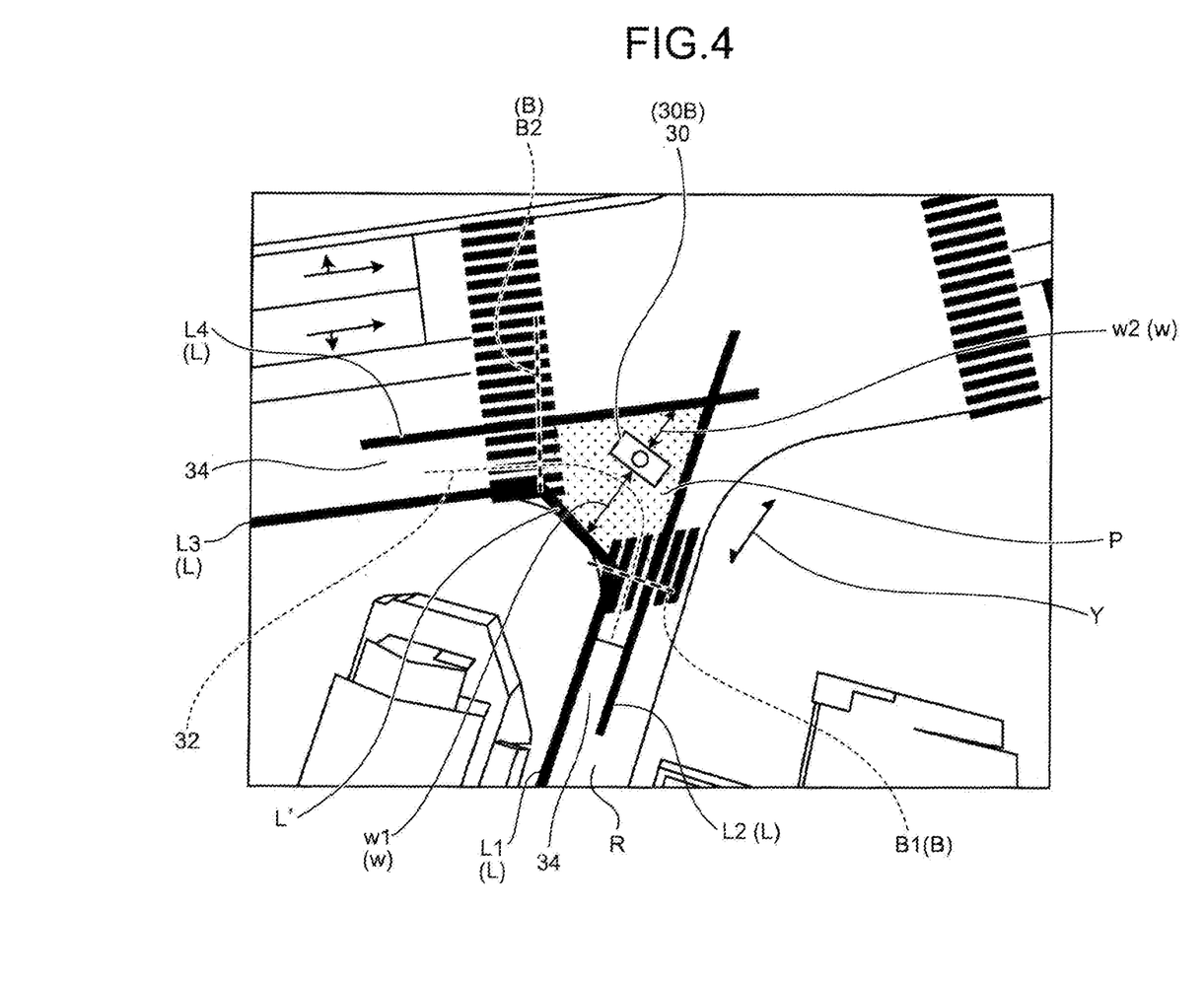
FIG. 4 is a schematic diagram illustrating a drivable range.

The drivable range indicates the range within which vehicles can run on the road R. FIG. 4 is a schematic diagram illustrating an example of a drivable range P at a curve.

The drivable range P represents the range within which the other vehicle 30 can run as well as represents the range that includes all routes that are off course on the inside and the outside of the reference path 32 and that are likely to be taken by the other vehicle 30 while running along the traffic lane 34 of the road R.

When the reference path 32 indicates a curve, the calculating unit 20E calculates the drivable range P according to the following method. Herein, the reference path 32 indicating a curve implies that the curvature of the reference path 32 is equal to or greater than a threshold value, which can be set in advance.

Regarding an area indicating a curve in the reference path 32 (hereinafter, sometimes called a curve area), the calculating unit 20E calculates the drivable range P based on the traffic lane 34 of the road R running along the reference path 32 and based on boundaries B between the curve area and the area other than the curve area.

More specifically, the calculating unit 20E identifies lines L indicating the edges of the traffic lane 34 along the reference path 32. The lines L are formed at the boundary between the concerned traffic lane 34 and the neighboring traffic lane 34 and at the boundary between the concerned traffic lane 34 and the bypass road (sidewalk). In the example illustrated in FIG. 4, the calculating unit 20E identifies lines L1, L2, L3, and L4 as the lines L of the traffic lane 34.

Subsequently, the calculating unit 20E identifies boundaries B1 and B2 as the boundaries B between the inside of the curve area, which indicates a curve, and the outside of the curve area. Moreover, the calculating unit 20E identifies a straight line L', which joins the point of intersection of the line L1 present on the inside of the curve area and the boundary B1 to the point of intersection of the line L3 present on the inside of the curve area and the boundary B2.

Then, the calculating unit 20E calculates, as the drivable range P, the area surrounded by the boundary B1, the straight line L', the boundary B2, the line L4 on the outside of the curve area, and the line L2 on the outside of the curve area.

Figure 5:
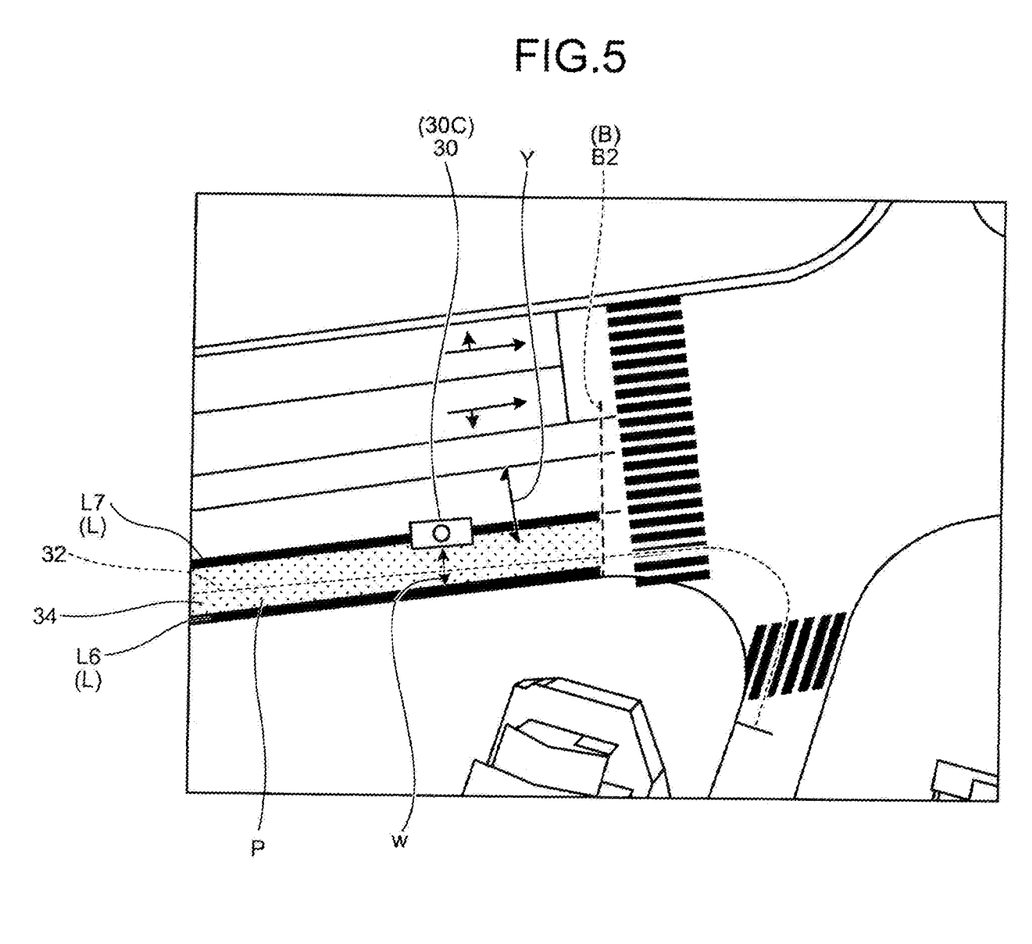
FIG. 5 is a schematic diagram illustrating a drivable range.

Meanwhile, regarding a straight area in the reference path 32, the calculating unit 20E calculates the drivable range P based on the traffic lane 34 of the road R along the reference path 32 and based on the boundaries B between the straight area and a curve area.

FIG. 5 is a schematic diagram illustrating an example of the drivable range P in a straight area.

More specifically, the calculating unit 20E identifies lines L (lines L6 and L7) indicating the edges of the traffic lane 34 of the road R running along the reference path 32. Then, the calculating unit 20E identifies the boundary B2 between the straight area and the curve area. Subsequently, the calculating unit 20E calculates, as the drivable range P, the area surrounded by the line L6, the line L7, and the boundary B2.

Meanwhile, the method implemented by the calculating unit 20E for calculating the drivable range P is not limited to the method described above. For example, the calculating unit 20E is not limited to calculate an area represented by a plurality of straight lines as the drivable range P, but can alternatively calculate an area represented by curved lines such as circular arcs as the drivable range P.

Given below is the explanation about the angular velocity corresponding to the curvature of the reference path 32. The angular velocity corresponding to the curvature of the reference path 32 implies the angular velocity at the time when the other vehicle 30 runs along the reference path 32 having that particular curvature. For example, the calculating unit 20E stores, in advance, the curvature and the angular velocity of a moving object at the time when that moving object runs along the reference path 32 having that curvature. Then, the calculating unit 20E can read the angular velocity corresponding to the curvature indicated for the reference path 32 obtained by the first obtaining unit 20C, and thus can calculate the angular velocity corresponding to the curvature of the reference path 32.

Alternatively, the calculating unit 20E can calculate the curvature of the reference path 32 from the obtained reference path 32 according to a known method.

Then, the calculating unit 20E refers to the moving object information and the road information, and calculates the predicted movement range 40 of the other vehicle 30 at each prediction timing.

More particularly, the calculating unit 20E calculates the predicted movement range 40 in such a way that the following calculation conditions are satisfied.

That is, the calculating unit 20E calculates the predicted movement range 40 in such a way that, greater the curvature of the reference path 32 or greater the angular velocity while running through the area having that curvature, the greater becomes the range in the width direction that is orthogonal to the direction of travel of the other vehicle 30. Moreover, the calculating unit 20E calculates the predicted movement range 40 in such a way that, smaller the curvature of the reference path 32 or smaller the angular velocity while running through the area having that curvature, the smaller becomes the range in the width direction. In the embodiment, the width direction indicates the direction orthogonal to the direction of travel of the other vehicle 30.

Furthermore, the calculating unit 20E calculates the predicted movement range 40 in such a way that, greater the drivable range P, the greater becomes the range in the width direction that is orthogonal to the direction of travel of the other vehicle 30. Moreover, the calculating unit 20E calculates the predicted movement range 40 in such a way that, smaller the drivable range P, the smaller becomes the range in the width direction.

For example, in order to calculate the predicted movement range 40 that satisfies the calculation conditions mentioned above, the calculating unit 20E uses the prediction result that includes the prediction value specified in the moving object information at the time of running on the reference path 32 and the variance value of the prediction value, so as to calculate the predicted movement range 40. The prediction value and the variance value indicate at least one of the position, the angle, the velocity, the acceleration, the angular velocity, and the angular acceleration of the other vehicle 30. Regarding the angle, when the current timing represents the prediction timing, the angle is assumed to be zero; and, for a prediction timing after the current timing, the angle represents the difference therebetween.

More particularly, in the embodiment, in order to calculate the predicted movement range 40 that satisfies the calculation conditions described above, the calculating unit 20E uses the extended Kalman filter (EKF) and calculates the predicted movement range 40.

In the observation values of the extended Kalman filter, the ideal state of driving is used. The ideal state of driving implies the ideal velocity, the ideal angular velocity, and the ideal position required for various types of driving such as the driving along the reference path 32, the driving for avoiding the obstacle H, the driving for changing the traffic lane 34, the driving for rounding a curve, and stopping.

Meanwhile, in the system model of the extended Kalman filter, a physics model is used. More particularly, in the system model, a model is used in which the acceleration and the angular acceleration converge to zero. That is because of the premise of convergence to stable driving.

Meanwhile, in the system model of the extended Kalman filter, instead of or along with the model in which the acceleration and the angular acceleration converge to zero, it is also possible to use a constant velocity model, a constant acceleration model, a constant angular velocity model, or a constant angular acceleration model.

Given below is the specific explanation of the calculation of the predicted movement range 40 as performed by the calculating unit 20E using the extended Kalman filter.

Firstly, the calculating unit 20E receives the moving object information at a specific prediction timing from the first obtaining unit 20C. Herein, the specific prediction timing represents the current timing, for example. As described above, the moving object information indicates at least one of the position, the angle, the velocity, the acceleration, the angular velocity, and the angular acceleration of the other vehicle 30. For example, the calculating unit 20E obtains, as the moving object information at the specific prediction timing, the position, the angle, the velocity, the acceleration, the angular velocity, the angular acceleration, and the covariance with respect to those variables.

The calculating unit 20E uses the moving object information at the specific prediction timing as the initial value of the prediction value of the extended Kalman filter.

Moreover, the calculating unit 20E obtains the road information of the other vehicle 30 at the specific prediction timing from the second obtaining unit 20D. That is, the calculating unit 20E obtains, from the second obtaining unit 20D, the road information that indicates the road R on which the other vehicle 30 is running at the specific prediction timing and indicates the roads R around the road R.

Then, the calculating unit 20E advances the prediction timing by an amount equal to one step. Herein, the time interval corresponding to one step can be set in advance.

Subsequently, the calculating unit 20E changes the physics model, which is to be used as the system model, to the state at the prediction timing advanced by the amount equal to one step, and calculates a system model value. As described above, the system model is used in which the acceleration and the angular acceleration converge to zero.

For that reason, the calculating unit 20E varies the acceleration and the angular acceleration of the other vehicle 30, as specified in the moving object information, by an amount equal to one step in the direction of convergence to zero. Then, the calculating unit 20E uses, as system model values, the values of the acceleration and the angular acceleration that are obtained after the change by the amount equal to the one step. Subsequently, the calculating unit 20E obtains the covariance in each variable of the system model values. Herein, the covariance can be obtained by performing Taylor expansion of the state equation of the physics model, or can be set to be a constant number.

Then, the calculating unit 20E varies the observation value by the amount equal to one step toward the ideal state of driving, so as to calculate an observation model value. As described above, the ideal state of driving implies the ideal velocity, the ideal angular velocity, and the ideal position required for various types of driving.

Thus, the calculating unit 20E varies the velocity, the angular velocity, and the position, as specified in the moving object information and the road information, to the ideal state of driving by the amount equal to one step using the moving object information and the road information. Then, the calculating unit 20E uses, as the observation model values, the value obtained after varying the velocity, the angular velocity, and the position by the amount equal to one step.

More specifically, for example, the calculating unit 20E applies driving conditions such as the speed limit, the deceleration condition at curves, and a stopping condition as specified in the road information to the velocity, the angular velocity, and the position specified in the moving object information and the road information; and calculates the ideal velocity at the prediction timing that has been advanced by one step from the specific prediction timing.

Moreover, at the prediction timing advanced by one step from the specific prediction timing, the calculating unit 20E calculates, as the ideal angular velocity, the angular velocity that is required in order to achieve convergence toward the reference path 32, which is specified in the road information, by the amount equal to one step and in order to avoid the obstacle H specified in the road information.

Moreover, the calculating unit 20E calculates the ideal position from the ideal velocity and the ideal angular velocity at the prediction timing advanced by one step from the specific prediction timing. Herein, the calculating unit 20E calculates the position in the width direction as the position. When the other vehicle 30 runs along the reference path 32, the position in the width direction is expressed by the coordinate values in the direction orthogonal to the direction of travel of the other vehicle 30 (i.e., the coordinate values in the width direction).

In this way, regarding the velocity, the angular velocity, and the position; the calculating unit 20E calculates, as the observation model values, the values obtained after advancing the prediction timing by the amount equal to one step.

Subsequently, regarding each component (the velocity, the angular velocity, and the position) calculated as an observation model value, the calculating unit 20E calculates a variance value for each component. Herein, the calculating unit 20E calculates the variance value in such a way that the average value thereof indicates the corresponding observation model value. In the variance value calculation, a plurality of variance values are calculated. That is, the calculating unit 20E calculates, for each component, a variance value having such a spread that the average value thereof represents the corresponding observation model value.

More particularly, regarding the velocity calculated as an observation model value, the calculating unit 20E calculates the variance values of the velocity. The variance values of the velocity can be calculated according to a known method based on the differences between the velocities predicted in the past and the velocity at the specific prediction timing. Alternatively, the calculating unit 20E can calculate a constant value as the variance value of the velocity.

Moreover, regarding the angular velocity calculated as an observation model value, the calculating unit 20E calculates the variance values of the angular velocity.

The calculating unit 20E calculates the variance value of the angular velocity, which serves as the prediction value of the other vehicle 30, based on the differences between the positions of the other vehicle 30 and the reference path 32 and based on the angular velocity required for running along the reference path 32 having a curvature.

More particularly, the calculating unit 20E calculates the variance value of the angular velocity according to two calculation methods.

In one calculation method, the differences between the positions of the other vehicle 30 and the reference path 32 are taken into account. As this calculation method, it is possible to implement the method given in Literature: Kim, Beomjun, and Kyongsu Yi. "Probabilistic and holistic prediction of vehicle states using sensor fusion for application to integrated vehicle safety systems." IEEE Transactions on Intelligent Transportation Systems 15.5 (2014): 2178-2190. That is, in this case, the calculating unit 20E performs calculation by taking into account the difference between the position of the other vehicle 30 and the position of the reference path 32 at the prediction timing advanced by the amount equal to one step from the specific prediction timing and by taking into account the inclination of the other vehicle 30 at the prediction timing. The inclination of the other vehicle 30 implies the inclination in the direction of travel of the other vehicle 30 with respect to the reference path 32 at the prediction timing. This inclination can be calculated from the road information and the moving object information.

In the other calculation method, the magnitude of the angular velocity is taken into account. In that case, the calculating unit 20E calculates the variance value of the angular velocity using Equation (1) given below.

$$\mathrm{cov}_{yr} = V_{const}(\gamma/\gamma_{max}) \tag{1}$$

$$\gamma = v \cos \theta / R \tag{2}$$

Herein, $\mathrm{cov}_{yr}$ represents the variance value of the angular velocity. Moreover, $V_{const}$ represents a constant number of the angular velocity variance. Furthermore, $\gamma$ is expressed in Equation (2) given above. Moreover, R represents the curvature radius of the reference path 32. Furthermore, v represents the velocity calculated as an observation model value; and $\theta$ represents the angle calculated as an observation model value. Moreover, $\gamma_{max}$ represents the maximum value of the angular velocity required for rounding a curve having the curvature equal to or greater than a threshold value.

The calculating unit 20E calculates the variance value of the angular velocity using Equation (1) given above. Herein, greater the angular velocity, the greater is the variance value that is obtained.

In the embodiment, the calculating unit 20E calculates, as the variance value of the angular velocity, the result of combining the variance values obtained according to the two calculation methods explained above.

Meanwhile, regarding the position calculated as an observation model value, the calculating unit 20E calculates the variance values of the position. As described above, in the embodiment, the position implies the position in the width direction that is orthogonal to the direction of travel of the other vehicle 30.

In the embodiment, the calculating unit 20E calculates the variance values of the position based on the road information obtained by the second obtaining unit 20D. More specifically, the calculating unit 20E calculates the variance value of the position, which serves as a prediction value in the width direction of the other vehicle 30, based on the drivable range P.

More particularly, firstly, the calculating unit 20E calculates the drivable range P. As described above, the calculating unit 20E classifies the reference path 32 into curve areas and straight areas and, regarding each curve area and each straight area, calculates the drivable range P (see FIGS. 4 and 5).

Then, the calculating unit 20E calculates, in the drivable range P, a maximum distance w in the width direction of the other vehicle 30 between the outer frame indicating the drivable range P and the other vehicle 30.

When the drivable range P illustrated in FIG. 4 is calculated, from among the distances between the other vehicle 30 and the outer frame of the drivable range P (for example, from among distances w1 and w2) in the width direction of the other vehicle 30 (in the direction of an arrow Y), the calculating unit 20E calculates the longest distance w1 as the maximum distance w.

When the drivable range illustrated in FIG. 5 is calculated, the calculating unit 20E calculates the maximum distance w from among the distances between the other vehicle 30 and the drivable range P in the width direction of the other vehicle 30 (in the direction of the arrow Y).

Returning to the explanation with reference to FIG. 3, the calculating unit 20E calculates the variance value of the position using Equation (3) given below.

$$\text{cov}_y = (c \cdot w/3)^2 \quad (3)$$

In Equation (3), $\text{cov}_y$ represents the variance value of the position. Moreover, c represents a constant number, and w represents the maximum distance. Moreover, in Equation (3), the reason for dividing the multiplication value of c and w by "3" is due to taking into account the property that 99.7% of the normal distribution is included in the threefold range of the standard variation.

Subsequently, the calculating unit 20E calculates the Kalman gain using the covariance of the calculated observation model and the covariance of the system model. In order to calculate the Kalman gain, a known method can be used. More particularly, the calculating unit 20E calculates, as the Kalman gain, the value obtained when the covariance obtained by advancing the system model by the amount equal to one step is divided by the covariance obtained by adding the abovementioned covariance and the covariance of the observation model.

Then, using the Kalman gain and the observation value, the calculating unit 20E corrects the system model value and corrects the variance of each component of the system model value; and, at the prediction timing advanced by the amount equal to one step, calculates the prediction value of each component of the moving object information as well as calculates the variance value of each prediction value.

Then, from among the eventually-calculated prediction values of the components of the moving object information and the variance values of the prediction values, the calculating unit 20E sets the prediction value of the position, the variance value of the prediction value of the position, and a chi-square distribution value indicating the credible section of an error ellipsoid; and sets an equation for the error ellipsoid. Herein, the chi-square distribution value can be set in advance.

Subsequently, the calculating unit 20E calculates, as the predicted movement range 40 at the prediction timing, the ellipse represented by the equation for the error ellipsoid.

In this way, in the embodiment, the calculating unit 20E calculates the predicted movement range 40 at each prediction timing using the extended Kalman filter.

Given below is the explanation of the output control unit 20F. The output control unit 20F outputs the output information to at least either the output unit 10A or the driving control unit 10G.

In the embodiment, the output information contains information indicating the predicted movement range 40 at each prediction timing.

For example, the output control unit 20F outputs the output information to the output unit 10A. Upon receiving the output information, the communicating unit 10D of the output unit 10A sends the output information to an external device. Moreover, for example, the display 10E of the output unit 10A displays the output information. Furthermore, for example, the speaker 10F of the output unit 10A outputs a sound corresponding to the output information. The sound corresponding to the output information can be a voice indicating the output information or a warning sound according to the output information.

Moreover, for example, the output control unit 20F outputs the output information to the driving control unit 10G. As described above, the driving control unit 10G controls the driving unit 10H of the moving object 10. Upon receiving the output information, the driving control unit 10G determines about the surrounding situation based on the output information and the information obtained from the sensor 10B; and controls the amount of acceleration, the amount of braking, and the steering angle. For example, based on the predicted movement range 40 of the other vehicle 30, the driving control unit 10G controls the vehicle so as to avoid the other vehicle 30 and keep the vehicle on the traffic lane being currently followed, as well as to maintain the inter-vehicular distance to the vehicle in front and to the other vehicle 30 to a predetermined distance or more.

As a result of performing such control, the driving control unit 10G can achieve driving safety of the moving object 10.

Meanwhile, the output control unit 20F can store the output information in the memory unit 20B. Moreover, the output control unit 20F can output the output information to other processing function units (for example, a collision determination function and a motion prediction function).

Figure 6:
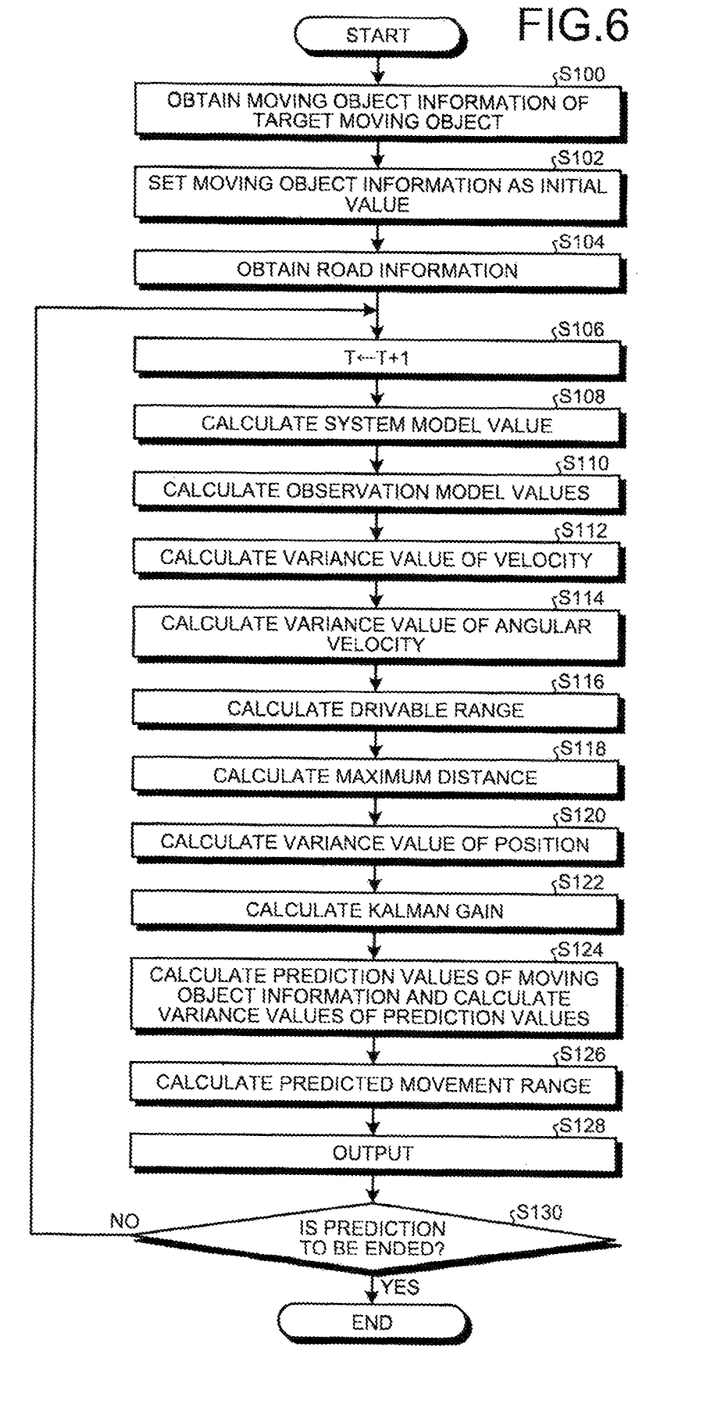
FIG. 6 is a flowchart for explaining a sequence of information processing.

Given below is the explanation of an exemplary sequence of information processing performed by the processing unit 20A. FIG. 6 is a flowchart for explaining an exemplary sequence of information processing performed by the processing unit 20A.

Firstly, the first obtaining unit 20C obtains the moving object information at a prediction timing T (Step S100). The prediction timing T represents the specific prediction timing mentioned above. Then, the calculating unit 20E sets, as the initial value of the prediction value of the extended Kalman filter, the moving object information at the prediction timing T obtained at Step S100 (Step S102).

Subsequently, the second obtaining unit 20D obtains the road information at the prediction timing T (Step S104).

Then, the calculating unit 20E advances the prediction timing T by the amount equal to one step (Step S106).

Subsequently, the calculating unit 20E calculates a system model value (Step S108). At Step S108, the calculating unit 20E varies the acceleration and the angular velocity of the other vehicle 30, as specified in the moving object information before the advancement of the prediction timing T by the amount equal to one step, by the amount equal to one step in the direction of convergence to zero, so as to calculate the system model value. Then, the calculating unit 20E obtains the covariance of each variable of the system model value.

Subsequently, the calculating unit 20E calculates the observation model values (Step S110). At Step S110, the calculating unit 20E varies the velocity, the angular velocity, and the position specified in the moving object information and the road information, which is available before the advancement of the prediction timing T by the amount equal to one step, by the amount equal to one step toward the ideal state of driving, so as to calculate the observation model values.

Then, the calculating unit 20E calculates the variance value of the velocity calculated as an observation model value at Step S110 (Step S112).

Subsequently, the calculating unit 20E calculates the variance value of the angular velocity calculated as an observation model value at Step S110 (Step S114).

Then, regarding the reference path 32 specified in the road information that is obtained at Step S104, the calculating unit 20E calculates the drivable range P according to the method described earlier (Step S116). Subsequently, the calculating unit 20E calculates, in the drivable range P, the maximum distance w in the width direction of the other vehicle 30 between the outer frame indicating the drivable range P and the other vehicle 30 (Step S118). Then, the calculating unit 20E calculates the variance value of the position using the maximum distance w, which is calculated at Step S118, and using Equation (3) given earlier (Step S120).

Subsequently, the calculating unit 20E calculates the Kalman gain using the covariance of the system model as calculated at Step S108 and using the covariance of the observation model as calculated at Steps S112 to S120 (Step S122).

Then, the calculating unit 20E calculates, at the prediction timing T that has been advanced by the amount equal to one step at Step S106, the prediction values of the components of the moving object information and the variance values of the prediction values (Step S124). At Step S124, using the Kalman gain calculated at Step S122, using the observation model values calculated at Step S110, and using the variances of the components of the observation model values calculated at Steps S112 to S120; the calculating unit 20E corrects the system model value calculated at Step S108 and corrects the variances of the components of the system model value, and resultantly calculates the prediction values and the variance values of the prediction values.

Then, the calculating unit 20E calculates the predicted movement range 40 at the prediction timing T that has been advanced by the amount equal to one step at Step S106 (Step S126). At Step S126, the calculating unit 20E calculates, as the predicted movement range 40, the ellipse represented by an equation for an error ellipsoid that is set using, from among the prediction values of the components of the moving object information and the variance values of the prediction values as calculated at Step S124, the variance value of the prediction value of the position and a chi-square distribution value indicating the credible section of the error ellipsoid.

Subsequently, the output control unit 20F outputs the output information, which contains the predicted movement range 40 calculated at Step S126 and the prediction timing of the predicted movement range 40, to at least one of the output unit 10A and the driving control unit 10G (Step S128).

Thus, for example, based on the predicted movement range 40, the driving control unit 10G controls the driving unit 10H of the moving object 10 in which the information processing device 20 is installed. For example, the driving control unit 10G controls the vehicle so as to avoid the other vehicle 30 and the obstacles and keep the vehicle on the currently-followed traffic lane, as well as to maintain the inter-vehicular distance to the vehicle in front and to the other vehicle 30 at a predetermined distance or more.

Then, the calculating unit 20E determines whether or not to end the prediction (Step S130). For example, the calculating unit 20E performs the determination at Step S130 by determining whether or not the prediction has been performed for a predetermined number of prediction steps. If it is determined at Step S130 to not end the prediction (No at Step S130), then the system control returns to Step S106. When it is determined at Step S130 to end the prediction (Yes at Step S130), then it marks the end of the present routine.

In this way, in the embodiment, the calculating unit 20E calculates the predicted movement range 40 for each prediction timing T.

Thus, for example, as illustrated in FIG. 2, the calculating unit 20E calculates the predicted movement range 40 for each prediction timing T. For example, assume that, at the prediction timing T, the other vehicle 30 is present at the position of another vehicle 30A. In that case, at each prediction timing T advanced by the amount equal to one or more steps (for example, the position of another vehicle 30B and the position of another vehicle 30C), the calculating unit 20E of the information processing device 20 calculates the predicted movement range 40 of the other vehicles 30 (a predicted movement range 40B and a predicted movement range 40C).

That is, the calculating unit 20E calculates, for each prediction timing T, the predicted movement range 40 that is ellipsoidal in shape and that is centered on the position at which the other vehicle 30 is assumed to reach at the prediction timing T. Meanwhile, as described earlier, the shape of the predicted movement range 40 is not limited to the ellipsoidal shape.

As illustrated in FIG. 2, as a result of performing the operations described above, the calculating unit 20E calculates the predicted movement range 40B having a greater size in the width direction in a curve area such as a traffic intersection and calculates the predicted movement range 40C having a smaller size in the width direction in a straight area.

As described above, the information processing device 20 according to the embodiment includes the first obtaining unit 20C and the second obtaining unit 20D. The first obtaining unit 20C obtains moving object information related to a moving object (the other vehicle 30). The second obtaining unit 20D obtains road information. The calculating unit 20E calculates the predicted movement range 40 of the moving object (the other vehicle 30) based on the moving object information and the road information.

In this way, in the information processing device 20 according to the embodiment, the predicted movement range 40 of the other vehicle 30 is calculated using the road information and the moving object information instead of using only the moving object information. Hence, in the information processing device 20 according to the embodiment, it becomes possible to calculate an appropriate predicted movement range 40 corresponding to the moving object information and the road information.

For example, as described above, in the information processing device 20 according to the embodiment, the predicted movement range 40B having a greater size in the width direction is calculated in a curve area such as a traffic intersection, and the predicted movement range 40C having a smaller size in the width direction is calculated in a straight area.

Thus, in the information processing device 20 according to the embodiment, the predicted movement range 40 can be calculated with accuracy.

Moreover, in the information processing device 20 according to the embodiment, the driving control unit 10G drives the driving unit 10H according to the predicted movement range 40. For that reason, in the information processing device 20 according to the embodiment, in addition to the effects achieved as explained above, it becomes possible to provide the predicted movement range 40 that is useful in enabling avoiding collision with the other vehicle 30. Moreover, in the information processing device according to the embodiment, since an excessively wide predicted movement range 40 is prevented from getting calculated, in addition to the effects achieved as explained above, it becomes possible to prevent the issuance of unnecessary warnings to the moving object 10.

First Modification Example

In the embodiment described above, the explanation is given about a configuration in which the calculating unit 20E calculates the predicted movement range 40 using an extended Kalman filter. However, as long as the predicted movement range 40 is calculated in such a way that the calculation conditions explained in the embodiment are satisfied, the calculating unit 20E can use some other known filter instead of the extended Kalman filter.

For example, in order to calculate the predicted movement range 40 that satisfies the calculation conditions explained earlier, the calculating unit 20E can use a Kalman filter, or a particle filter, or an unscented Kalman filter instead of the extended Kalman filter.

In the case of using the Kalman filter, the variables need to be treated in a linear manner. Hence, the number of variables gets limited as compared to the case of using the extended Kalman filter. However, in an identical manner to the embodiment described above, if the Kalman filter is used based on the road information and the moving object information, the calculating unit 20E can calculate the variance values of the prediction values and can calculate the predicted movement range 40.

In the case of using a particle filter, a likelihood function needs to be designed in place of an observation model. However, if the observation model value and the variance values of the components of the observation model value as calculated in the embodiment described above are used in likelihood calculation, then the calculating unit 20E can calculate the predicted movement range 40 in an identical manner to the embodiment described above.

In the unscented Kalman filter, in an identical manner to the extended Kalman filter, observation model values and a system model value need to be defined. Thus, in this case too, the calculating unit 20E can calculate the predicted movement range 40 using the calculation method in an identical manner to the calculation of the variance values of the prediction values used in the embodiment described above.

Second Modification Example

There are times when the obstacle H is present on the road R.

In that case, the calculating unit 20E calculates the predicted movement range 40 further based on obstacle information.

Herein, the obstacle information indicates the obstacle H. For example, the obstacle information indicates at least one of the position of the obstacle H and the size of the obstacle H.

When the road information contains at least one of the position of the obstacle H and the size of the obstacle H, the calculating unit 20E identifies the obstacle information from the road information. Then, based on the position and/or the size of the obstacle H as specified in the obstacle information, the calculating unit 20E sets the drivable range P and the maximum distance w in such a way that the obstacle H is avoided.

Figure 7:
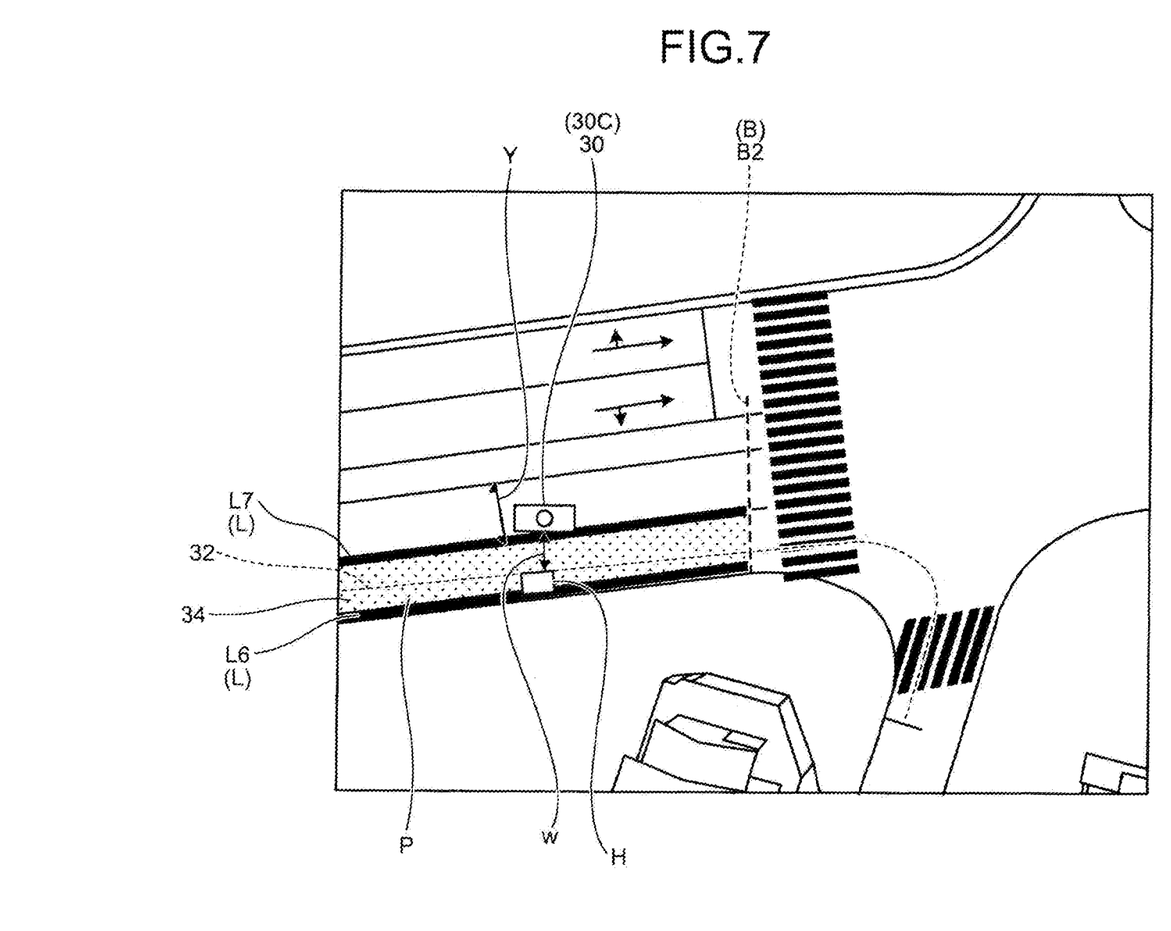
FIG. 7 is a schematic diagram illustrating the drivable range.

The relevant explanation is given with reference to FIG. 7. Herein, FIG. 7 is a schematic diagram illustrating an example of the drivable range P. The calculating unit 20E calculates the drivable range P according to the method described earlier in the embodiment. However, the calculating unit 20E calculates, as the drivable range P, the area excluding the overlapping area with the obstacle H from the drivable range P calculated according to the method described earlier in the embodiment.

Then, in an identical manner to the embodiment, the calculating unit 20E calculates, in the drivable range P, the maximum distance w in the width direction of the other vehicle 30 between the outer frame indicating the drivable range P and the other vehicle 30. Meanwhile, as described above, in the second modification example, the calculating unit 20E calculates, as the drivable range P, the area excluding the overlapping area with the obstacle H from the drivable range P calculated according to the method described earlier in the embodiment. Hence, in the second modification example, regarding the area excluding the overlapping area with the obstacle H from the drivable range P calculated according to the method described earlier in the embodiment, the calculating unit 20E calculates the maximum distance w in the width direction between the other vehicle 30 and the outer frame of that calculated area.

Then, the calculating unit 20E can use the calculated drivable range P and the maximum distance w to calculate the variance value of the position and the Kalman gain in an identical manner to the embodiment described earlier, and can calculate the predicted movement range 40.

Hardware Configuration

Figure 8:
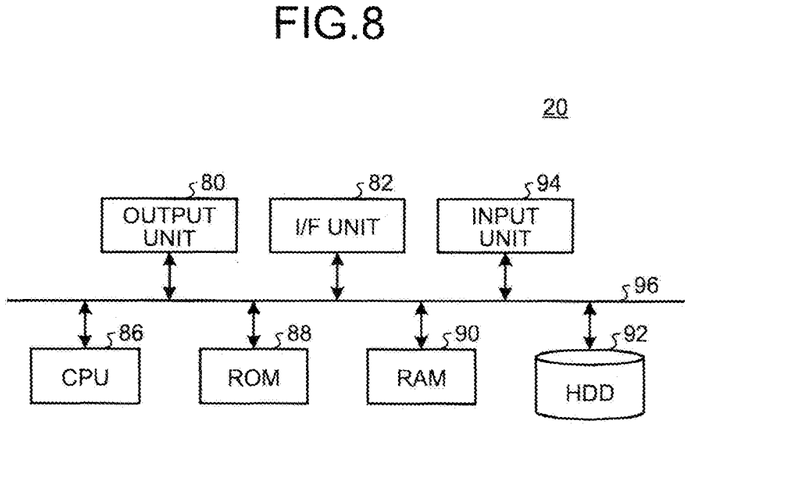
FIG. 8 is a hardware configuration diagram.

Given below is the explanation of an exemplary hardware configuration of the information processing device 20 according to the embodiment. FIG. 8 is a diagram illustrating an exemplary hardware configuration of the information processing device 20 according to the embodiment.

The information processing device 20 according to the embodiment has the hardware configuration of a normal computer that includes a control device such as a central processing unit (CPU) 86; memory devices such as a read only memory (ROM) 88, a random access memory (RAM) 90, and a hard disk drive (HDD) 92; an I/F unit 82 representing an interface with various devices; an output unit 80 that outputs a variety of information such as output information; an input unit 94 that receives user operations; and a bus 96 that connects the other constituent elements to each other.

In the information processing device 20 according to the embodiment described above, the CPU 86 reads a computer program from the ROM 88 into the RAM 90 and executes it so that the functions explained above are implemented in the computer.

The computer program that is executed in the information processing device 20 according to the embodiment and that is meant for implementing various operations can be stored in the HDD 92. Alternatively, the computer program that is executed in the information processing device 20 according to the embodiment and that is meant for implementing various operations can be stored in advance in the ROM 88.

Still alternatively, the computer program that is executed in the information processing device 20 according to the embodiment and that is meant for implementing various operations can be stored as an installable file or an executable file in a computer-readable memory medium such as a compact disc read only memory (CD-ROM), a compact disk readable (CD-R), a memory card, a digital versatile disk (DVD), or a flexible disk (FD); and can be provided as a computer program product. Still alternatively, the computer program that is executed in the information processing device 20 according to the embodiment and that is meant for implementing various operations can be stored in a downloadable manner in a computer connected to a network such as the Internet. Still alternatively, the computer program that is executed in the information processing device 20 according to the embodiment and that is meant for implementing various operations can be distributed via a network such as the Internet.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing device comprising:
   one or more processors configured to:
      obtain detection information from a sensor configured to detect information of a moving object and calculate moving object information related to the moving object using the detection information;
      obtain map data from an external device via a communicating unit and obtain road information based on the map data;
      calculate a predicted movement range of the moving object based on the moving object information and the road information; and
      output the predicted movement range of the moving object to a driving control unit, the driving control unit being configured to control movement of the moving object based on the predicted movement range of the moving object,
   wherein the predicted movement range is calculated
      according to a calculation result obtained from the moving object information and the road information by calculating at least one of curvature of a reference path and an angular velocity corresponding to the curvature of the reference path, and
      in such a way that
         greater the curvature of the reference path or greater the angular velocity while running through an area having the curvature, a range in a width direction that is orthogonal to a direction of travel of the moving object becomes greater, and
         smaller the curvature of the reference path or smaller the angular velocity while running through an area having the curvature, the range in the width direction becomes smaller,
   and wherein
      the one or more processors are configured to calculate the predicted movement range using a prediction value that is calculated using an extended Kalman filter (EKF); and
      the one or more processors are configured to calculate a variance value of the angular velocity, which serves as the prediction value of the moving object, based on differences between positions of the moving object and the reference path and based on angular velocity required for running along the reference path having the curvature.

2. The device according to claim 1, wherein the one or more processors are configured to calculate the predicted movement range further based on obstacle information indicating an obstacle.

3. The device according to claim 1, wherein the one or more processors are configured to calculate the predicted movement range in such a way that
   greater a drivable range, the range in the width direction becomes greater, and
   smaller the drivable range, the range in the width direction becomes smaller.

4. The device according to claim 1, wherein the prediction value indicates at least one of position, angle, velocity, acceleration, angular velocity, and angular acceleration of the moving object.

5. The device according to claim 1, wherein, with respect to a curve area having curvature equal to or greater than a threshold value in the reference path, the one or more processors are configured to calculate the drivable range according to a traffic lane of a road along the reference path and according to a boundary between the curve area and area other than the curve area.

6. The device according to claim 1, wherein the moving object information indicates at least one of position, angle, velocity, acceleration, angular velocity, and angular acceleration of the moving object.

7. The device according to claim 1, wherein the road information indicates at least one of the reference path, a traffic lane width, the curvature of the reference path, a position of an obstacle, and a size of an obstacle.

8. The device according to claim 1, wherein the one or more processors are further configured to control a driving unit of the moving object in which the information processing device is installed, based on the predicted movement range.

9. An information processing method comprising:
   obtaining detection information from a sensor configured to detect information of a moving object and calculating moving object information related to the moving object using the detection information;
   obtaining map data from an external device via a communicating unit and obtaining road information based on the map data;
   calculating a predicted movement range of the moving object based on the moving object information and the road information; and
   outputting the predicted movement range of the moving object to a driving control unit, the driving control unit being configured to control movement of the moving object based on the predicted movement range of the moving object,
   wherein the predicted movement range is calculated
      according to a calculation result obtained from the moving object information and the road information by calculating at least one of curvature of a reference path and an angular velocity corresponding to the curvature of the reference path, and
      in such a way that
         greater the curvature of the reference path or greater the angular velocity while running through an area having the curvature, a range in a width direction that is orthogonal to a direction of travel of the moving object becomes greater, and
         smaller the curvature of the reference path or smaller the angular velocity while running through an area having the curvature, the range in the width direction becomes smaller,
   and wherein
      the calculating calculates the predicted movement range using a prediction value that is calculated using an extended Kalman filter (EKF); and the calculating calculates a variance value of the angular velocity, which serves as the prediction value of the moving object, based on differences between positions of the moving object and the reference path and based on angular velocity required for running along the reference path having the curvature.

10. A computer program product comprising a computer readable non-transitory medium including programmed instructions, wherein the instructions, when executed by a computer, cause the computer to perform:

obtaining detection information from a sensor configured to detect information of a moving object and calculating moving object information related to the moving object using the detection information;

obtaining map data from an external device via a communicating unit and obtaining road information based on the map data;

calculating a predicted movement range of the moving object based on the moving object information and the road information; and outputting the predicted movement range of the moving object to a driving control unit, the driving control unit being configured to control movement of the moving object based on the predicted movement range of the moving object, wherein the predicted movement range is calculated according to a calculation result obtained from the moving object information and the road information by calculating at least one of curvature of a reference path and an angular velocity corresponding to the curvature of the reference path, and in such a way that greater the curvature of the reference path or greater the angular velocity while running through an area having the curvature, a range in a width direction that is orthogonal to a direction of travel of the moving object becomes greater, and smaller the curvature of the reference path or smaller the angular velocity while running through an area having the curvature, the range in the width direction becomes smaller, and wherein the calculating calculates the predicted movement range using a prediction value that is calculated using an extended Kalman filter (EKF); and the calculating calculates a variance value of the angular velocity, which serves as the prediction value of the moving object, based on differences between positions of the moving object and the reference path and based on angular velocity required for running along the reference path having the curvature.

\* \* \* \* \*